(12) United States Patent
Chen et al.

(10) Patent No.: US 6,852,554 B2
(45) Date of Patent: Feb. 8, 2005

(54) EMISSION LAYER FORMED BY RAPID THERMAL FORMATION PROCESS

(75) Inventors: Zhizhang John Chen, Corvallis, OR (US); Sriram Ramamoorthi, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 62 days.

(21) Appl. No.: 10/085,866

(22) Filed: Feb. 27, 2002

(65) Prior Publication Data

US 2003/0160228 A1 Aug. 28, 2003

(51) Int. Cl.[7] .......................... H01L 21/00; H01L 29/06
(52) U.S. Cl. ........................ 438/20; 257/9; 257/10; 438/22
(58) Field of Search .................. 257/9, 10, 30, 257/37–39; 313/309–311; 438/20, 22, 48; 345/75.2; 445/51; 378/122

(56) References Cited

U.S. PATENT DOCUMENTS

| | | | |
|---|---|---|---|
| 4,923,421 A | 5/1990 | Brodie et al. ................. 445/24 |
| 5,142,184 A | 8/1992 | Kane ......................... 313/309 |
| 5,374,844 A | 12/1994 | Moyer ........................ 257/582 |
| 5,507,676 A | 4/1996 | Taylor et al. ................ 445/50 |
| 5,528,103 A | 6/1996 | Spindt et al. ................ 313/497 |
| 5,557,596 A | 9/1996 | Gibson et al. ............... 369/101 |
| 5,559,342 A | 9/1996 | Tsukamoto et al. .......... 257/10 |
| 5,760,417 A | * 6/1998 | Watanabe et al. ............ 257/11 |
| 6,011,356 A | 1/2000 | Janning et al. ........... 315/169.4 |
| 6,023,124 A | 2/2000 | Chuman et al. ............ 313/310 |
| 6,033,924 A | 3/2000 | Pack et al. ...................... 438/20 |
| 6,249,080 B1 | * 6/2001 | Komoda et al. ............ 313/310 |
| 6,313,043 B1 | 11/2001 | Hattori ....................... 438/745 |
| 2002/0102799 A1 | * 8/2002 | Wawer et al. ............... 438/301 |
| 2002/0177276 A1 | * 11/2002 | Su .............................. 438/264 |
| 2003/0141494 A1 | 7/2003 | Govyadinov et al. |

FOREIGN PATENT DOCUMENTS

| | | | |
|---|---|---|---|
| EP | 0913849 | 5/1999 | |
| EP | 1003195 | 5/2000 | |
| EP | 1094484 | 4/2001 | |
| EP | 1267380 | 12/2002 | |
| JP | 2000-76986 A | * 3/2000 | ........... H01L/1/312 |
| WO | WO01/80273 A1 | 10/2001 | ............. H01J/7/18 |
| WO | WO02/35572 | 5/2002 | |
| WO | WO02/089166 | 11/2002 | |
| WO | WO02/089167 | 11/2002 | |
| WO | WO02/089168 | 11/2002 | |
| WO | WO02/103738 | 12/2002 | |

OTHER PUBLICATIONS

"A Decade Away: Atomic Resolution Storage," Scientific American: Feature Article: Avoiding a Data Crunch: May 2000, http://www.sciam.com/2000/0500issue/0500toigbox 6.html.

* cited by examiner

Primary Examiner—Shouxiang Hu

(57) ABSTRACT

An emitter has a rapid thermal process (RTP) formed emission layer of $SiO_2$, $SiO_xN_y$ or combinations thereof. The emission layer formed by rapid thermal processing does not require electroforming to stabilize the film. The RTP grown films are stable and exhibit uniform characteristics from device to device.

30 Claims, 6 Drawing Sheets

US 6,852,554 B2

EMISSION LAYER FORMED BY RAPID THERMAL FORMATION PROCESS

FIELD OF THE INVENTION

The invention is in the microelectronics field. The invention particularly concerns emitters and devices incorporating emitters.

BACKGROUND OF THE INVENTION

Emitters have a wide range of potential applicability in the microelectronics field. An emitter emits electrons in response to an electrical signal. The controlled emissions form a basis to create a range of useful electrical and optical effects. Prior conventional emitters include spindt tip cold cathode devices.

The geometry of cold cathode spindt tip emitters presents a barrier to size reduction. As the size of a spindt tip device is reduced, the spindt tip becomes more susceptible to damage from contaminants in a vacuum ionized from the emissions from the tip. The ionized contaminants are attracted to the spindt tip and collide with it, thereby causing damage. A vacuum space around the spindt tip therefore requires an increasingly high vacuum to avoid the potential damage caused by ionized contaminants. For similar reasons, the tip geometry is also a barrier to incorporation of emitters with integrated circuits.

Flat emitters are comparably advantageous because they present a larger emission surface that can be operated in lower vacuum environments. Flat emitters include a dielectric emission layer that responds to an electrical field created by other portions of the device. Flat emitters are tunneling emission devices. An electric field proximate the surface of the emission layer narrows a width of a potential barrier existing at the surface of the emission layer. This allows a quantum tunnelling effect to occur, whereby electrons cross through the potential barrier and are emitted from the material.

Flat emission layers formed by low temperature chemical vapor deposition or room temperature sputter/evaporation techniques are potentially unstable. Specifically, such layers often have electrical characteristics that change with time. In addition, layers formed by such processes must be conditioned, e.g., through electro-forming processes. Even with conditioning, significant variation in device performance is possible. Electro-forming is also a time consuming process.

SUMMARY OF THE INVENTION

An emitter has a rapid thermal process (RTP) formed emission layer of $SiO_2$, $SiO_xN_y$ or combinations thereof. The emission layer formed by rapid thermal processing does not require electro-forming to stabilize the film. The RTP grown films are stable and exhibit uniform characteristics from device to device.

A particular preferred emitter of the invention includes a RTP formed emission layer formed on a silicon or polysilicon substrate. The RTP formed emission layer is within an area defined by an oxide layer on the silicon or polysilicon substrate. A particularly preferred embodiment emission layer is a combination $SiO_2$ and $SiO_xN_y$ layer, having approximately 20 Å $SiO_2$ and 30–130 Å $SiO_xN_y$.

DETAILED DESCRIPTION OF THE INVENTION

The present invention concerns an emitter including a rapid thermal process formed emission layer of $SiO_2$, $SiO_xN_y$ or combinations thereof. The emission layer is formed on a silicon or polysilicon substrate in an area defined by an oxide, e.g., a field oxide. This emission layer provides advantages in a device formation process, as well. The rapid thermal process used in forming devices including an emission layer according to the invention produces stable dielectric films that exhibit consistent characteristics when formation process conditions are maintained. A vacuum condition of approximately $10^{-5}$ Torr is a sufficient operational condition for a preferred embodiment emitter.

The invention will now be illustrated with respect to a preferred embodiment emitter and representative devices incorporating the preferred embodiment emitter. In describing the invention, particular exemplary devices, formation processes, and device applications will be used for purposes of illustration. Dimensions and illustrated devices may be exaggerated for purposes of illustration and understanding of the invention. A single emitter illustrated in conventional fashion by a two dimensional schematic layer structure will be understood by artisans to provide teaching of three-dimensional emitter structures. The teachings of the invention are readily incorporated into conventional integrated circuit formation processes, as will also be appreciated by artisans.

Figure 1:
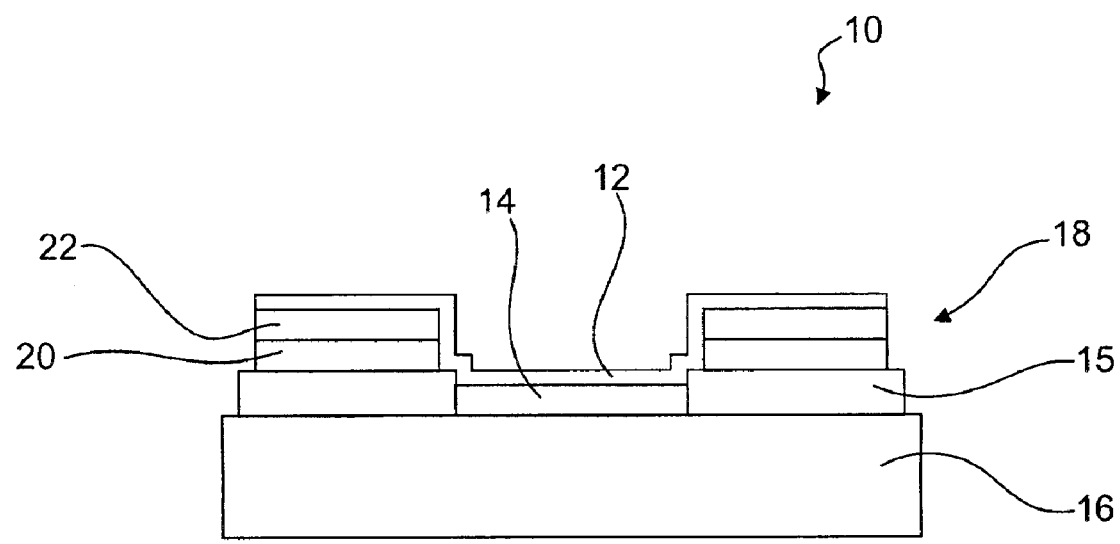
FIG. 1 is a schematic representation of a preferred embodiment emitter of the invention.

Referring now to FIG. 1, a preferred embodiment emitter 10 of the invention is shown in a two-dimensional schematic cross section. The preferred embodiment emitter 10 is a metal-insulator-semiconductor (MIS) device including a flat emission area defined by a thin metal layer 12 formed over a RTP emission layer 14. The emission layer 14 is formed in an area defined by an oxide layer 15, e.g., a field oxide. The RTP emission layer is formed of $SiO_2$, $SiO_xN_y$ or combinations thereof. A N++ silicon or polysilicon substrate 16 is an electron supply source for the emitter 10. A field is applied to stimulate emissions through the emission layer 14 when an appropriate voltage is applied to a metal contact structure 18. In the emitter 10, the metal contact structure 18 is shown in a preferred form as a multilayer contact of Au and Ta. The separate layers 20 and 22 may, for example, form part of a circuit interconnect pattern in an integrated circuit into which the emitter 10 is incorporated. Application of a voltage to the metal contact structure 18 establishes an electric field between the substrate 16 and the thin metal layer 12, which acts as a cathode.

The nature of the emissions and required operational conditions to produce emissions will depend upon the thickness of the emission layer 14. A preferred emission layer is a combination layer having a 20 Å $SiO_2$ layer and a $SiO_xN_y$ layer in the approximate range of 30–130 Å. Designers applying the invention will understand that thinner layers reduce the tunneling resistance of the layer and produce emissions at lower voltages. However, a point is reached when the layer becomes too thin and dielectric breakdown is possible. The lower limit for thinness is also affected by dielectric strength of the material. The RTP formed emission layers of the invention are stable, high quality dielectrics. To the extent that quality may be optimized in the RTP growth process, thinner layers may be found to produce sound dielectrics. Designers will also understand that an optimized thickness produces maximum emission efficiency. If the emission layer is too thin, high leakage current and electric shorting are possible, while if is too thick, the emission current will be greatly reduced. Increasing the thickness of the emission layer 14 will increase its tunneling resistance. At a certain point, the tunneling resistance will be larger than desirable. The ultimate upper thickness limit, though, is also application specific. A willingness to allow higher voltages will permit the use of thicker layers. In sum, when lower voltages are critical, thinner layers produce emissions at lower voltages. When higher voltages are possible, thicker layers produce increased emissions. The thin metal layer 12 is formed of a metal or alloy and in a thickness to provide a sufficient electron field. On the other hand, the thickness is limited to permit electron emissions to escape from the emission layer 14. A preferred thin metal layer 12 is a Pt layer of approximately 50–100 Å. Alternate preferred materials are Au, Ta, and combinations of Pt, Au or Ta. In addition to platinum, gold, and tantalum, other metals including molybdenum, iridium, ruthenium, chromium, or other refractive metals and alloys may be used. Similar possibilities exist for the metal contact structure 18.

Figure 2:
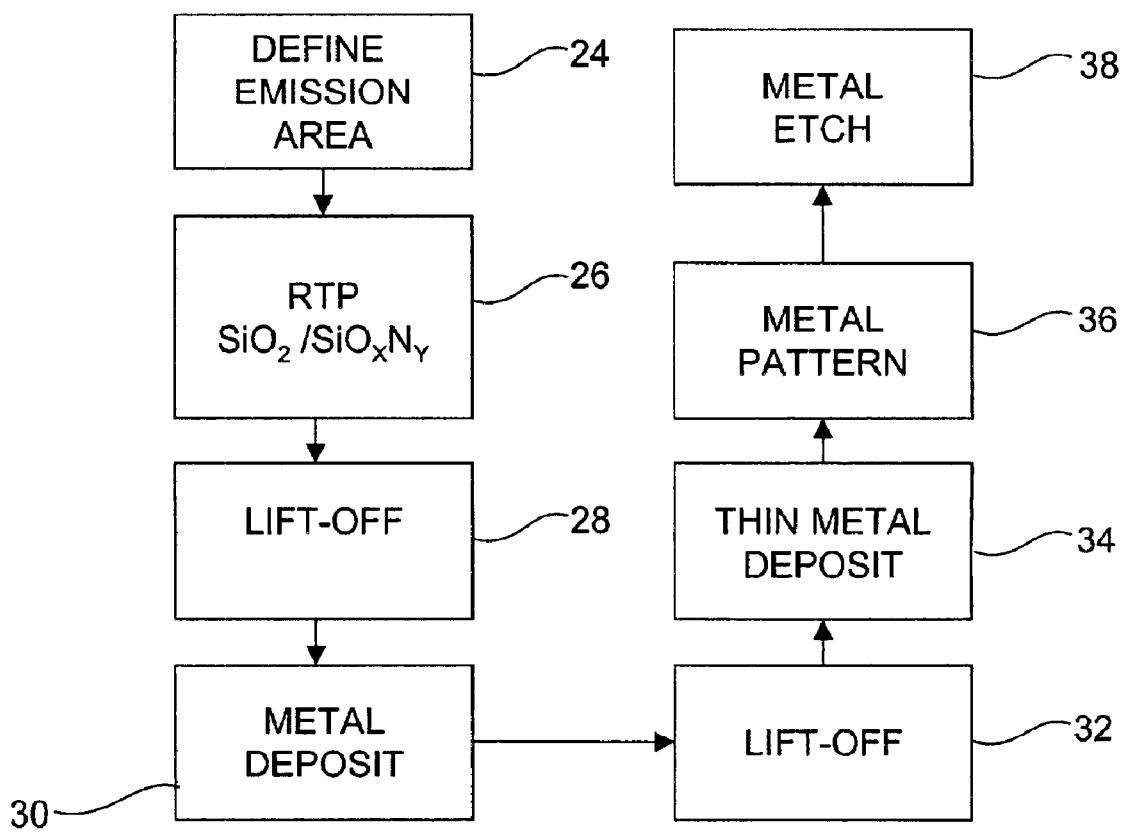
FIG. 2 is block diagram of a preferred embodiment emitter formation process usable to form the exemplary preferred embodiment emitter of FIG. 1.

Emitters of the invention are formed with an RTP process that is amenable to the incorporation of the invention into circuits and integrated circuit device applications. FIG. 2 is a block diagram showing the steps of a preferred embodiment method of the invention. The process steps of FIG. 2 begin with an appropriate silicon or polysilicon substrate, e.g., a N++ doped silicon wafer. The process steps, while discussed with respect to a single device may be carried out for the simultaneous production of one or many devices. Artisans will also appreciate that the steps of FIG. 2 illustrate significant steps of the preferred process, and ancillary processes may be carried out in practice along with the steps illustrated in FIG. 2.

In step 24, an oxide is used to define an emission area. The oxide serves to isolate the emission area from other devices. The manner of forming and patterning the oxide is a matter of design choice. Once the emission area is formed, in step 26, a rapid thermal process is used to form the emission layer. The emission layer may be formed as a single layer of $SiO_2$ or $SiO_xN_y$. The emission layer may also be formed as multiple layers, such as a layer of $SiO_2$ followed by a layer of $SiO_xN_y$. The emission layer of the invention formed by rapid thermal processing produces a high quality layer, whose crystal structure is excellent and stable. No ancillary step is required in the formation of the emission layer, e.g., there is no need for electro-forming processing. Metal contact structures are then formed. For example, a metal lift-off step 28 is followed by a metal deposition step 30, and a lift-off step 32. Optionally, there may be additional metal layers formed by similar steps after isolation steps, as in well known processes for forming multiple layers of metal interconnect patterns in an integrated circuit. The thin metal cathode is formed, for example, by a deposition step 34 with an isolation photo patterning step 36 and metal etch step 38 to pattern the thin metal.

As mentioned, potential uses of an emitter according to the invention, such as the emitter 10 of FIG. 1 are wide-ranging due to the general utility of emissions as a basis for electrical and electrooptical effects. Further, emitters of the invention are easily incorporated into integrated circuit fabrication techniques. A few particularly preferred applications of the emitter will now be discussed.

Figure 3:
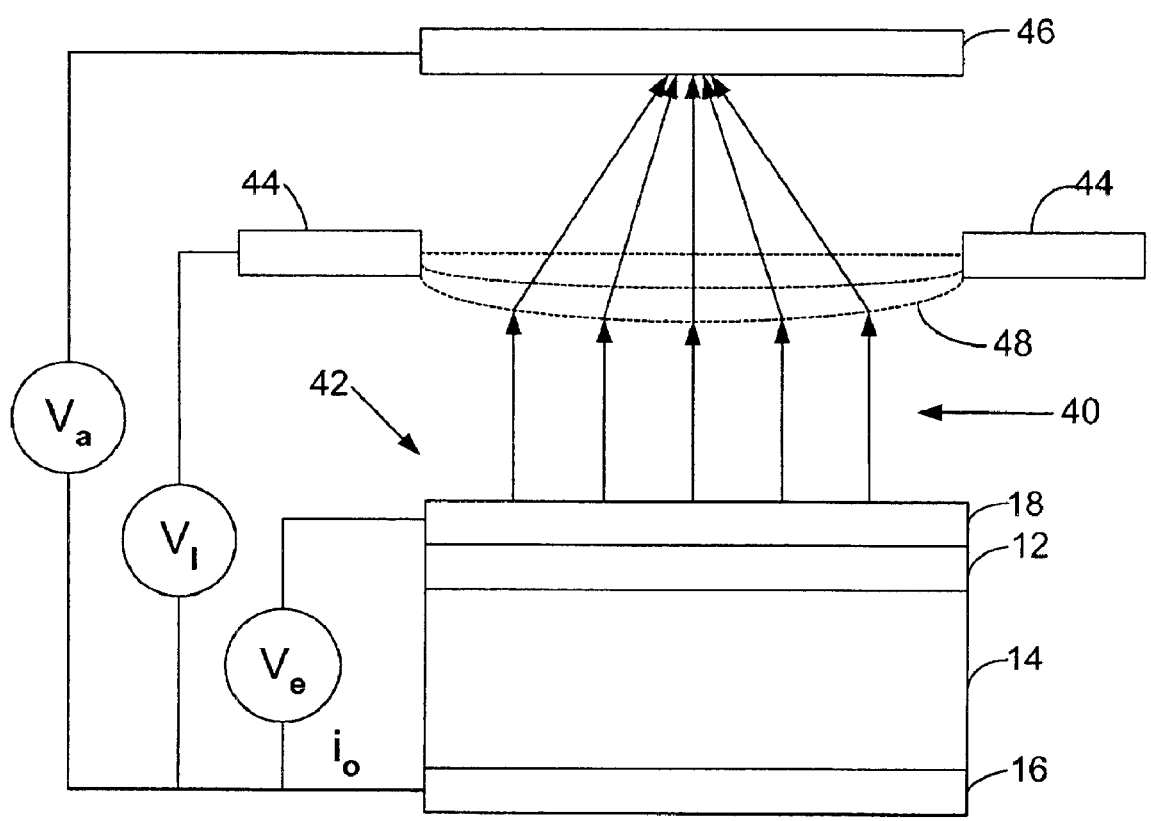
FIG. 3 is a block diagram of a preferred embodiment device having an emitter and a target medium.

FIG. 3 is an exemplary diagram of a preferred application of an emitter where a target medium receives focused emissions. In this application, the emissions 40 from an emitter 42 of the invention are focused by an electrostatic focusing device or lens 44, exemplified as an aperture in a conductor that is set at predetermined voltage that can be adjusted to change the focusing effect of the lens 44. Those skilled in the art will appreciate that lens 44 can be made from more than one conductor layer to create a desired focusing effect. The emissions 40 are focused by the lens 44 into a focused beam onto a target anode medium 46, which might be a memory or display medium, for example. The anode medium is set at an anode voltage $V_a$. The magnitude of $V_a$ will depend on the intended use and the distance from the anode medium 46 to the emitter 42. For example, with the anode medium being a recordable medium for a storage device, $V_a$ might be chosen to be between 500 and 1000 Volts. The lens 44 focuses the electron emission 40 by forming an electric field 48 in response to voltage $V_l$ within its aperture. By being set at a proper voltage difference from $V_e$, the electrons emitted from the emitter 42 are directed to the center of the aperture and then further attracted to the anode medium 46 to form the focused beam.

In another preferred embodiment, the anode medium 46 is a display medium. The focusing of the beam onto the anode medium then produces an effect to stimulate a visual display.

Figure 4:
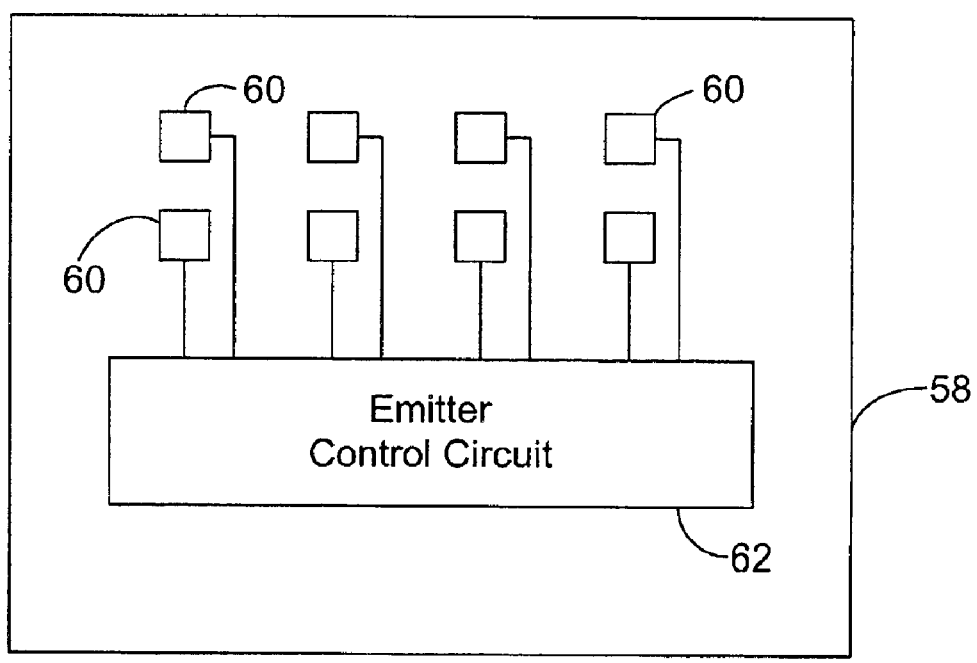
FIG. 4 is a block diagram of a preferred embodiment integrated circuit.

FIG. 4 is an exemplary embodiment of an integrated circuit 58 that includes at least one integrated emitter 60, but preferably a plurality of integrated emitters 60 arranged in an array. An emitter control circuit 62 is integrated onto the integrated circuit 58 and used to operated the at least one integrated emitter 60. Emitters 60 of the invention are thus incorporated into an integrated circuit, which is possible by virtue of the nature of the present emission layer.

Figure 5:
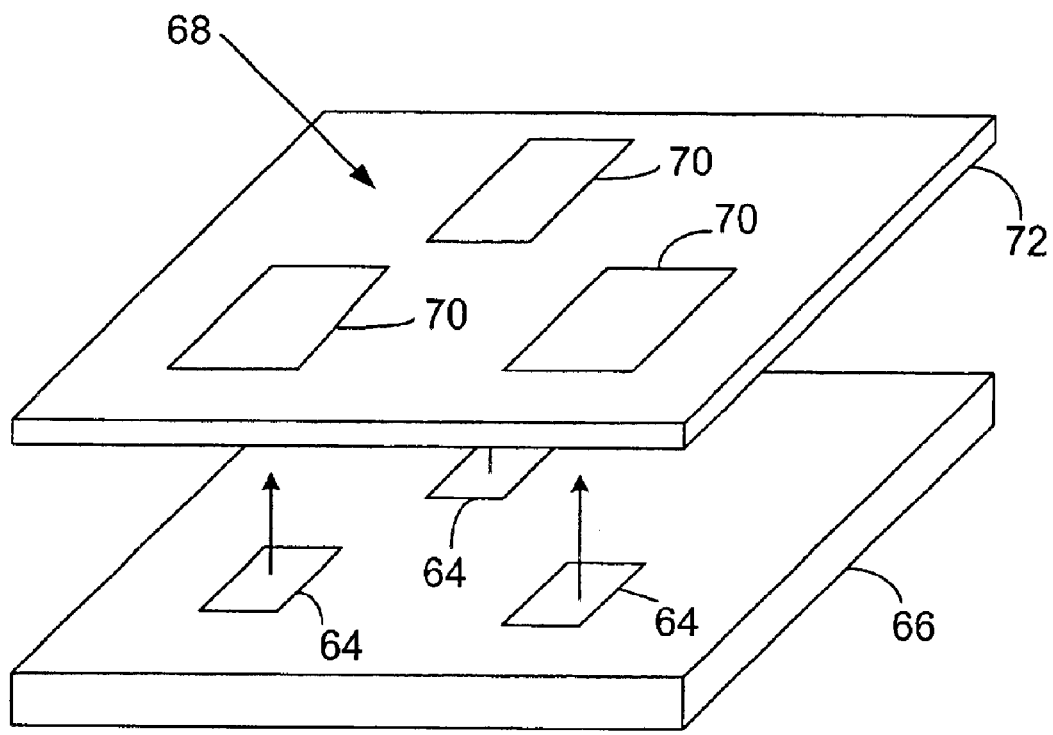
FIG. 5 is a block diagram of an alternative preferred embodiment display.

FIG. 5 is another alternative embodiment of a display application using an integrated emitter 64 of the invention. In this embodiment, a plurality of emitters 64 is formed in an integrated circuit 66. Each of the emitters 64 emits electrons. An anode structure 68 having multiple pixels 70 forming a display 72 receives the emitted energy. The pixels 70 are preferably a phosphor material that creates photons when struck by emissions from emitters 64.

Figure 6A:
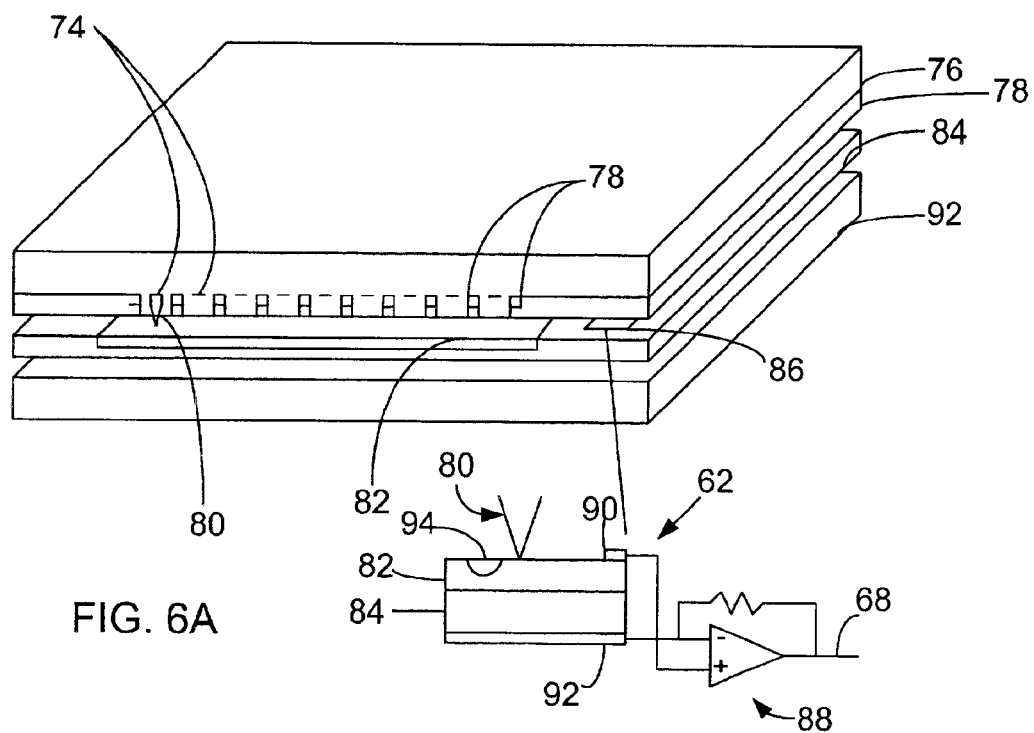
FIGS. 6A and 6B illustrate a preferred embodiment memory device.
Figure 6B:
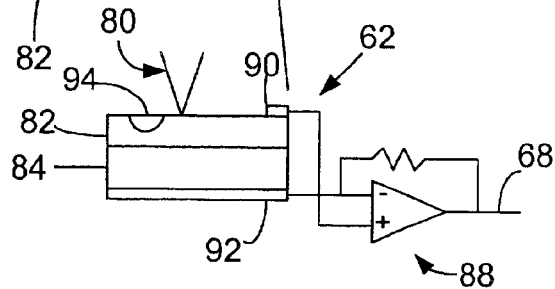

A particular preferred memory device is shown in FIGS. 6A and 6B. The memory device includes integrated emitters 74. In this exemplary embodiment, an integrated circuit (IC) 76 including a plurality of integrated emitters 74 has a lens array 78 of focusing mechanisms aligned with the integrated emitters 74. The lens array 78 is used to create a focused beam 80 that is used to affect a recording surface, media 82. Media 82 is applied to a mover 84 that positions the media 82 with respect to the integrated emitters 74 on IC 76. Preferably, the mover 84 has a reader circuit 86 integrated within. The reader 86 is shown as an amplifier 88 making a first ohmic contact 90 to media 82 and a second ohmic contact 92 to mover 84, preferably a semiconductor or conductor substrate. When a focused beam 80 strikes the media 82, if the current density of the focused beam is high enough, the media is phase-changed to create an affected media area 94. When a low current density focused beam 80 is applied to the media 82 surface, different rates of current flow are detected by amplifier 88 to create reader output.

Thus, by affecting the media 82 with the energy from the emitter 74, information is stored in the media using structural phase changed properties of the media. An exemplary phase-change material is $In_2Se_3$. Other phase change materials are known to those skilled in the art.

While a specific embodiment of the present invention has been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An emitter comprising:
   an electron supply layer;
   an oxide layer on said electron supply layer defining an emission area; and
   an emission layer in the emission area and in contact with said electron supply layer, said emission layer being formed by a rapid thermal process and selected from a group comprising $SiO_2$, $SiO_xN_y$ and combinations thereof.

2. The emitter according to claim 1, wherein said emission layer is in the approximate range of 50–150Å.

3. The emitter according to claim 2, wherein said emission layer comprises an approximate 20 Å $SiO_2$ layer and a $SiO_xN_y$ layer in the approximate range of 30–130 Å.

4. The emitter according to claim 1, wherein said emission layer comprises an approximate 20 Å $SiO_2$ layer and a $SiO_xN_y$ layer in the approximate range of 30–130 Å.

5. The emitter according to claim 1, wherein the emitter includes means for creating an electrical field to stimulate tunneling.

6. The emitter according to claim 5, wherein the means for creating comprises a metal contact structure and a thin metal layer disposed over said metal contact structure and said emission layer.

7. The emitter according to claim 6, wherein said thin metal layer is selected from a group comprising Pt, Au, Ta and combinations thereof.

8. The emitter according to claim 7, wherein said thin metal layer is approximately 50–100 Å.

9. The emitter according to claim 6, wherein said metal contact structure is part of a circuit interconnect metal structure in an integrated circuit including other devices.

10. The emitter according to claim 5, wherein the emitter is disposed relative to a memory medium to direct emissions toward the memory medium and thereby cause an effect in said memory medium.

11. The emitter according to claim 5, wherein the emitter is disposed relative to a display medium to direct emissions toward said display medium and thereby cause an effect in said display medium.

12. The emitter according to claim 5, wherein said electron supply layer comprises a silicon or polysilicon substrate and the emitter is disposed on said silicon or polysilicon substrate with emitter control circuitry to control the emitter.

13. A method for forming an emitter, comprising the steps of:
    forming a patterned oxide layer to define an emission area upon an electron supply layer; and
    with a rapid thermal formation process, forming an emission layer, within said emission area, of a material selected from a group of materials comprising $SiO_2$, $SiO_xN_y$ and combinations thereof.

14. The method of claim 13, further comprising a step of forming a metal contact structure on the pattered oxide layer.

15. The method of claim 14, further comprising a step of forming a thin metal layer on the emission layer and the metal contact structure.

16. The method of claim 14, wherein the metal contact structure comprises a single metal layer.

17. The method of claim 14, wherein the metal contact structure comprises multiple metal layers.

18. The method of claim 13, wherein said step of forming an emission layer comprises sequentially forming an approximate 20 Å $SiO_2$ layer and a $SiO_xN_y$ layer in the approximate range of 30–130 Å.

19. The method of claim 13, performed as part of an integrated circuit formation process to form the emitter as part of an integrated circuit including emitter control circuitry.

20. An integrated emitter circuit comprising:
    a silicon or polysilicon substrate;
    an oxide layer on said silicon or polysilicon substrate defining an emission area;
    an electron emission layer in the emission area and in contact with said silicon or polysilicon substrate, said electron emission layer being formed by a rapid thermal process and selected from a group comprising $SiO_2$, $SiO_xN_y$ and combinations thereof;
    a circuit interconnect electrical contact structure on said oxide layer; and
    a thin metal layer on said electron emission layer and said electrical contact structure.

21. The device of claim 20, wherein said electron emission layer comprises an approximate 20 Å $SiO_2$ layer and a $SiO_xN_y$ layer in the approximate range of 30–130 Å.

22. The device of claim 21, wherein said thin metal layer is selected from a group comprising Pt, Au, Ta and combinations thereof.

23. The device of claim 20, wherein said thin metal layer is selected from a group comprising Pt, Au, Ta and combinations thereof.

24. The device of claim 20, wherein said electrical contact structure comprises part of a circuit interconnect pattern connecting the device to other devices in an integrated circuit.

25. The device of claim 20 formed as part of an integrated circuit in a memory device, the memory device using electron emissions from the electron emitter to cause an effect in a memory medium disposed opposite the emitter.

26. The device of claim 20, formed as part of a memory device, the memory device including a plurality of the emitters and comprising:
    a lens for focusing an electron beam from the emitter to created a focused beam; and
    a memory medium in close proximity to the plurality of emitters, the memory medium having a storage area being in one of a plurality of states to represent information stored in the storage area, the states being responsive to the focused beam such that
    an effect is generated in the storage area when the focused beam impinges upon the storage area;
    a magnitude of the effect depends upon the state of the storage area; and
    information in the storage area is read by measuring the magnitude of the effect.

27. The device of claim 26, further comprising:
    a mover to position said memory medium with respect to the plurality of emitters; and
    a reader circuit integrated in said mover.

28. The device of claim 20, formed as part of a display device, the display device further comprising:
    a lens for focusing an electron beam from the emitter; and
    a coating on the lens to capture electrons from the emitter.

29. The device of claim 28, wherein the electron beam from the emitter comprises a visible light source.

30. The device of claim 20, formed as part of a display device, the display device further comprising:

a lens for focusing an electron beam from the emitter; and a display medium in close proximity to the emitter, the display medium producing a visible emission in response to the focused beam.

* * * * *